(12) United States Patent
Gryaznov et al.

(10) Patent No.: US 11,609,992 B2
(45) Date of Patent: Mar. 21, 2023

(54) SYSTEMS AND METHODS FOR ANTI-MALWARE SCANNING USING AUTOMATICALLY-CREATED WHITE LISTS

(71) Applicant: Acronis International GmbH, Schaffhausen (CH)

(72) Inventors: Dmitry Gryaznov, Moscow (RU); Oleg Ishanov, Moscow (RU); Vladimir Strogov, Mocow (RU); Andrey Kulaga, Moscow (RU); Igor Kornachev, Moscow (RU); Stanislav Protasov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 234 days.

(21) Appl. No.: 16/830,416

(22) Filed: Mar. 26, 2020

(65) Prior Publication Data

US 2020/0311270 A1 Oct. 1, 2020

Related U.S. Application Data

(60) Provisional application No. 62/826,192, filed on Mar. 29, 2019.

(51) Int. Cl.
*G06F 21/56* (2013.01)
*G06F 21/00* (2013.01)

(52) U.S. Cl.
CPC ......... *G06F 21/566* (2013.01); *G06F 21/561* (2013.01); *G06F 21/562* (2013.01); *G06F 21/568* (2013.01)

(58) Field of Classification Search
CPC .... G06F 21/566; G06F 21/561; G06F 21/562; G06F 21/568; G06F 21/56; G06F 21/567; G06F 21/50; G06F 21/565
See application file for complete search history.

(56) References Cited

U.S. PATENT DOCUMENTS

| 2006/0230452 | A1* | 10/2006 | Field | G06F 21/562 |
| | | | | 726/22 |
| 2009/0083852 | A1* | 3/2009 | Kuo | G06F 21/564 |
| | | | | 726/22 |
| 2012/0030731 | A1* | 2/2012 | Bhargava | G06F 21/604 |
| | | | | 726/3 |

* cited by examiner

*Primary Examiner* — Edward Zee
(74) *Attorney, Agent, or Firm* — ArentFox Schiff LLP; Michael Fainberg

(57) ABSTRACT

Disclosed herein are systems and method for scanning objects of a computing device, by an anti-malware, using a white list created for an organization based on data of the organization. In one aspect, an exemplary method comprises obtaining one or more objects of the organization from the computing device, and for each obtained object of the one or more objects, computing a hash value of the obtained object, determining whether the obtained object is whitelisted, and scanning the obtained object based on whether the obtained object is whitelisted, wherein the whitelist is created based on scanning of objects stored in archives of the organization, and the obtained object is determined as being whitelisted when the computed hash value of the obtained object matches a hash value of an object in a whitelist created for the organization.

18 Claims, 6 Drawing Sheets

SYSTEMS AND METHODS FOR ANTI-MALWARE SCANNING USING AUTOMATICALLY-CREATED WHITE LISTS

CROSS-REFERENCE TO RELATED APPLICATIONS

This application claims the benefit of U.S. Provisional Application No. 62/826,192, filed Mar. 29, 2019, which is herein incorporated by reference.

FIELD OF TECHNOLOGY

The present disclosure relates to the field of data and device security, and, more specifically, to systems and methods for scanning objects of a computing device, by an anti-malware, using a white list created for an organization based on data of the organization—thereby improving data security.

BACKGROUND

Modern communications devices, e.g., computers and smartphones, transmit and receive vast amounts of data. These devices are routinely being used to access all types of valuable data, e.g., proprietary data, financial data, health care related data, personal data (e.g., videos, images, etc.), and the like. Unauthorized entities may attempt to access these valuable data.

One approach to protect the valuable data is to implement an anti-malware software (e.g., anti-virus software) and run the anti-malware software on the computing devices. Files and data stored on various computing devices of an entity, e.g., a company, organization, etc., may then be scanned periodically to detect malware. However, there are disadvantages to scanning everything stored on the various computers, servers, networks, etc., of the organization.

First, the number of files and the amount of data that needs to be scanned is often very large. For example, an organization may have a number of archives in which copies of data are stored. The data may include installed and configured operating systems, various applications necessary for the operations of the organization, data files (e.g., documents, databases, media files, etc.). Therefore, the scanning activity for the various archives of the organization adds tremendous load on computing resources. The increased load causes the computing devices to suspend other processes and tasks—thereby slowing down all other processes of the organization.

Second, as the volume of data increases, the amount of false positives detected by the anti-malware while performing the scans also increases. This is because the large number of files and data inevitably contain a lot of files that the anti-malware will consider as malware. For example, files containing executable codes may be considered as malicious files, even if their purpose is legitimate and the codes are executed for the legitimate business of the organization.

One way to mitigate the number of false positives is to create a whitelist that contains objects (e.g., files, programs, processes, etc.) that are considered safe. When the anti-malware is performing the scan, the objects that are placed in the whitelist are simply ignored. However, the creation of whitelists involves a is a manual and labor intensive process. Typically, the whitelist is created by antivirus (anti-malware) analysts or IT administrators who are responsible for setting up and configuring the anti-malware programs for the organization.

Therefore, there is a need to improve anti-malware, whitelist creation and efficiency of techniques used to provide the data security.

SUMMARY

Aspects of the disclosure relate to the field of scanning objects of a computing device, by an anti-malware, and building of optimal whitelists for protecting devices from malware.

In one exemplary aspect, a method identifies a plurality of objects in a backup archive that is connected to a network comprising a plurality of computing devices. The method scans the plurality of objects in the backup archive to generate a whitelist, wherein the whitelist identifies (1) a subset of the plurality of objects that do not need to be scanned at a subsequent time and (2) respective hash values of objects in the subset. The method initiates a malware scan in a computing device of the plurality of computing devices. For each object of the computing device, the method computes a hash value of the object, determines whether the object is in the whitelist by comparing the hash value of the object with the respective hash values of the objects identified in the whitelist, and in response to determining that the object is in the whitelist, does not scan the object in the malware scan.

In some aspects, in response to determining that the object is not in the whitelist, the method scans the object in the malware scan.

In some aspects, the method provides a result of the malware scan to a provider of a protection service.

In some aspects, scanning the plurality of objects in the backup archive to generate the whitelist further comprises for each respective object of the plurality of objects, scanning the respective object, obtaining metadata associated with the respective object, and storing the obtained metadata in a database.

In some aspects, the metadata associated with a respective object of the plurality of objects of the organization includes at least a parameter for storing a respective hash value of the respective object.

In some aspects, the metadata associated with the respective object of the plurality of objects of the organization further includes parameters for storing one or more of: a name of the respective object, a size of the respective object, a digital signature of the respective object, a number of the plurality of computing devices where the respective object is used, a number of the plurality of computing devices where the respective object is installed, a time at which the respective object first appears in the organization, flags for anti-malware scanning when the respective object was previously scanned by an anti-malware scanner.

In some aspects, the malware scan is a first malware scan and the network is a first network. The method further comprises detecting that the computing device has left the first network to join a second network of a different organization, and initiating a second malware scan on the computing device, wherein the second malware scan uses a different whitelist of the different organization.

In some aspects, a first object, which (1) was not scanned in the first malware scan and (2) is in the whitelist, is scanned in the second malware scan in response to determining that the first object is not in the different whitelist.

In some aspects, a first object, which (1) was scanned in the first malware scan and (2) is not in the whitelist, is not scanned in the second malware scan in response to determining that the first object is in the different whitelist.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for scanning objects of a computing device, by an anti-malware, using a white list created for an organization based on data of the organization. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
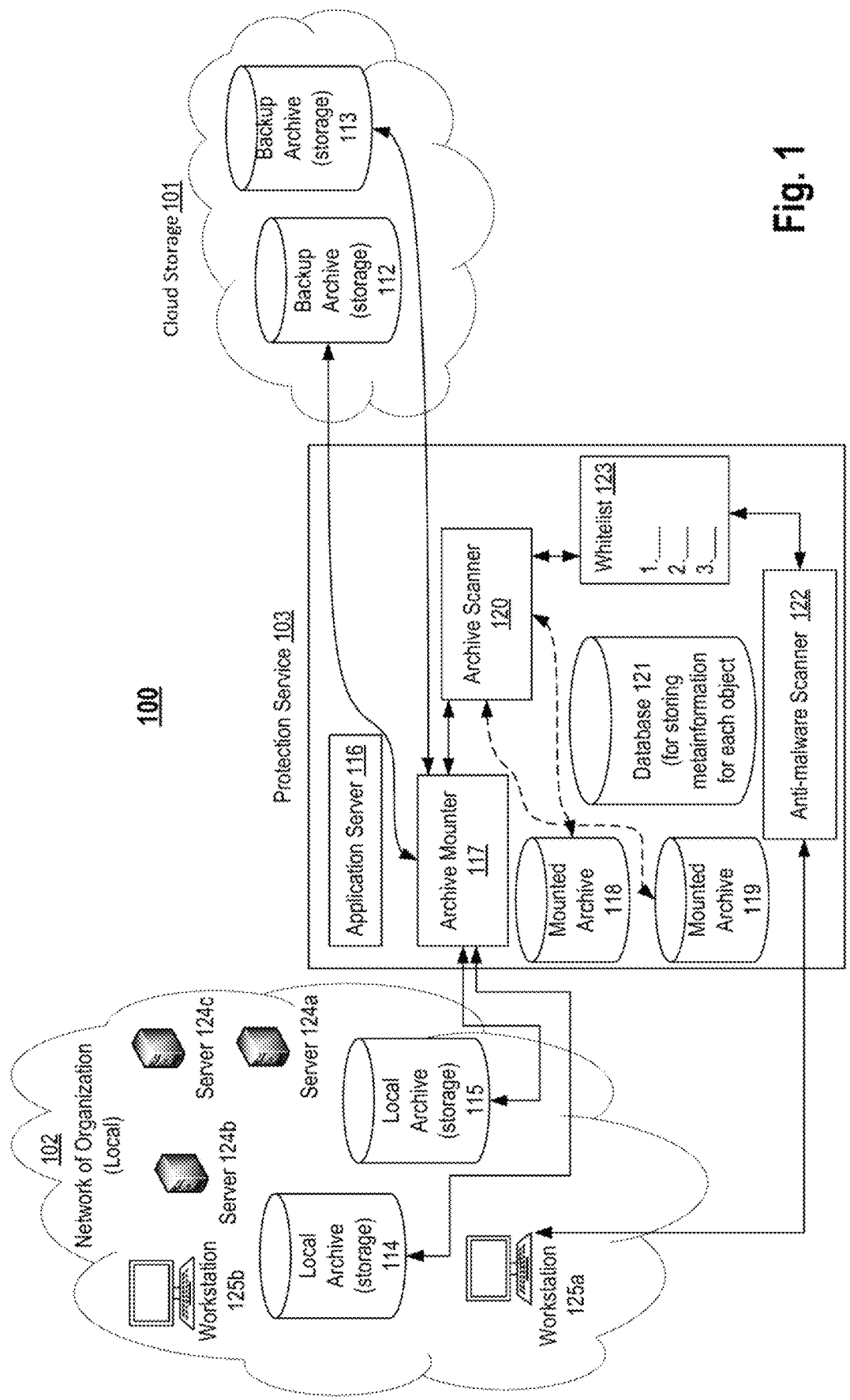
FIG. 1 is a block diagram illustrating an exemplary network for building whitelists for protecting devices from malwares in accordance with aspects of the present disclosure.

FIG. 1 is a block diagram illustrating an exemplary network 100 for scanning objects of a computing device, by an anti-malware, using a white list created for an organization based on data of the organization in accordance with aspects of the present disclosure. The network 100 comprises a cloud storage network 101, a network 102 of an organization (e.g., a network including servers, workstations, databases, etc., of the organization), and a system for providing a protection service 103 in accordance with the teachings of the present disclosure. The organization stores content (e.g., files, data, etc.) in backup archives 112 and 113 located in the cloud storage network 101. The organization 102 also stores content in local network archives 114 and 115 located within the network 102 of the organization. Servers 124a-124c and workstations 125a-125b are used by various members of the organization to access and/or modify data and/or files that belong to the organization. In other words, if the organization is a company, employees of the company may access data and/or files stored in the local archives 114-115 or in the backup archives 112-113. The servers 124a-124c and workstations 125a-125b may reach the anti-malware scanner 122 via a network or the organization (e.g., a virtual private network), a cloud network, or any other standard network used to enable computing devices to transmit and receive data. Moreover, the transmission and reception of data may be via wire-based or wireless networks.

As described above, organizations, e.g., the organization with network 102, need to protect valuable data by deploying anti-malware measures. However, the anti-malware programs typically consume a lot of computing resources when scanning all files, programs and processes that belong to the organization. Thus, IT administrators build whitelists for objects to be excluded from the scanning activity. Unfortunately, the process used for the creation of the whitelist is time and labor intensive.

In one aspect, the method of the present disclosure creates an optimal whitelist using a protection service 103, in an automated manner, such that false-positives during scanning can be reduced while simultaneously reducing the need for IT administrators to populate the whitelist. In other words, the network 100 includes the protection service 103 for implementing the method of the present disclosure for building optimal whitelists. In one aspect, the whitelist is created based on data stored in archives of the organization.

The protection service 103 comprises one or more of: an application server 116 for implementing the protection service, an archive mounter 117, storages 118-119 for storing mounted archives, an archive scanner 120, a database 121 for storing meta information associated with objects scanned by the archive scanner 120, a whitelist 123 created for the organization.

In one aspect, the protection service 103 further includes an anti-malware (e.g., anti-virus) scanner 122. In another aspect, the anti-malware scanner 122 is in another location, e.g., the anti-malware scanner 122 may be deployed on a server of the organization, rather than in the protection service 103. In other words, the anti-malware scanner 122 may access the whitelist 123 via a cloud network or any other standard network used to enable computing devices to transmit and receive data.

In one aspect, the whitelist 123 may be stored on a separate database, e.g., in a cloud storage, on a different server, etc. As such, without loss of generality, the location of the whitelist may be determined based on an agreement between the provider of the protection service and the organization for which the protection service is being provided.

In order to create the whitelist for an organization, first, the method retrieves, from archives of the organization, any number of objects of the organization to be scanned (i.e., analyzed). For example, the organization may have subscribed to the protection service. Then, the application server 116 may receive a request from the organization to create a whitelist. The whitelist is to be created for use during anti-malware scanning, e.g., by the anti-malware scanner 122. The application server may then retrieve any number of objects of the organization to be scanned in accordance with the subscription. The objects are retrieved from any number of archives of the organization.

In one aspect, the objects of the organization to be scanned comprise all existing objects of the organization, e.g., all files and programs of the organization. In one aspect, the objects of the organization to be scanned are selected based on a pre-determined criteria. For example, objected created and/or saved within a given time interval may be scanned. In one aspect, the archives of the organization include one or more of: archives stored in cloud storage and archives stored in a local network of the organization. In one aspect, the objects of the organization to be scanned include: files, programs and processes of the organization. In one aspect, the objects of the organization to be scanned are selected based on the protection service to which the organization subscribes.

Then, for each object of the retrieved objects of the organization, the method scans the object using static rules and/or a machine learning model, obtains metadata associated with the object, and stores the obtained metadata in a database. In other words, "scanning" includes analysis against the static rules and/or machine learning model. Thus, objects may be analyzed and deemed as trusted, untrusted, etc. based on the results of the scanning.

In one aspect, the scanning of the object comprises: mounting the object as a temporary virtual drive, e.g., as shown in 118 or 119, and scanning the object that is mounted as the temporary virtual drive using the static rules and/or the machine learning model. For example, the archive mounter 117 may mount the object, and the archive scanner 120 may scan the object and store metadata associated with the object in the database 121.

In one aspect, the scanning of the object may be performed without mounting the object as a virtual drive. When the scanning of the object is performed without mounting the object, the protection service already knows the internal format of the archive at which the object is located. In other words, a special malware scanner that is aware of the internal formal of the archive may be needed. In contrast, when the scanning of the object is preceded by the mounting of the object, standard malware scanners may be used.

In one aspect, the metadata associated with the object includes at least a parameter for storing a hash value of the object. In another aspect, the metadata associated with the object further includes parameters for storing one or more of: a name of the object, a size of the object, a digital signature of the object, a number of machines where the object is used, a number of machines where the object is installed, a time at which the object first appears in the organization, flags for anti-malware scanning (if the object was previously scanned by an anti-malware scanner), etc. In one aspect, the digital signature maybe associated with a vendor. For example, a vendor of a file or program may sign the digital signature. It is noted that the parameter for digital signatures is applicable for all executable objects/files.

In one aspect, the parameter for storing the hash value of the object is a primary key of the object for identifying the object in a database. All of the other parameters of the object are bound to the hash value of the object. Thus, only the hash value of the object is used for file identification and comparison.

Then, the method creates a whitelist, e.g., whitelist 123, for the organization. The whitelist that is created includes trusted objects selected from among the retrieved objects of the organization. An object of the retrieved objects of the organization is deemed as being "trusted" based on the results of the scanning of the object.

Note that the content of the whitelist is specifically built for the organization based entirely on archival content belonging to the organization. Thus, a same file or program (e.g., from a given vendor), may be considered trusted for one organization but not for another organization. For example, a file containing executable codes on financial data may be scanned and analyzed for a financial institution and be deemed as trusted, while the same file may be deemed untrusted for another type of institution. Therefore, the whitelist—being specific to the organization—reduces the number of objects that need to be periodically rescanned/reanalyzed.

In one aspect, the whitelist created for the organization for the organization is updated in a predetermined schedule. For example, objects archived after the whitelist was created (or updated) may be scanned for consideration as being trusted. For instance, the organization may request that the protection service periodically update the whitelist.

Once the whitelist is created and stored for the organization, an anti-malware scanner, e.g., anti-malware scanner 122, performs scans only on objects that are not whitelisted or are altered. In one aspect, the scanning by the anti-malware scanner is initiated in response to receiving a request from a user. For example, a user may initiate scanning for a server of the servers 124a-124c or a workstation of the workstations 125a-125b.

In one aspect, the scanning by the anti-malware comprises: obtaining one or more objects of the organization from a computing device, and for each obtained object of the one or more objects, computing a hash value of the obtained object, determining whether the obtained object is whitelisted, and scanning the obtained object based on whether the obtained object is whitelisted, wherein the whitelist is created based on scanning of objects stored in archives of the organization, and the obtained object is determined as being whitelisted when the computed hash value of the obtained object matches a hash value of an object in a whitelist created for the organization. For example, suppose the computing device on which the anti-malware is being run is server 124a. Then, objects of the server 124a are obtained for scanning/analysis. Then, for each object obtained from the server 124a, a determination is made as to whether the obtained objected is whitelisted. The scanning is then performed based on whether or not the obtained object is whitelisted.

In one aspect, the scanning based on whether the obtained object is whitelisted comprises: for the obtained object that is not whitelisted, performing a scanning of the obtained object; and for the obtained object that is determined as being whitelisted, skipping a scanning of the whitelisted obtained object.

In one aspect, the anti-malware provides a result of the scanning to the protection service. For example, the anti-malware may send a notification to the protection service indicating whitelisted objects that have been altered. For instance, the protection service may base, at least in part, a period of time or a frequency of updating the whitelist based on a number of notifications received from the anti-malware.

Figure 2:
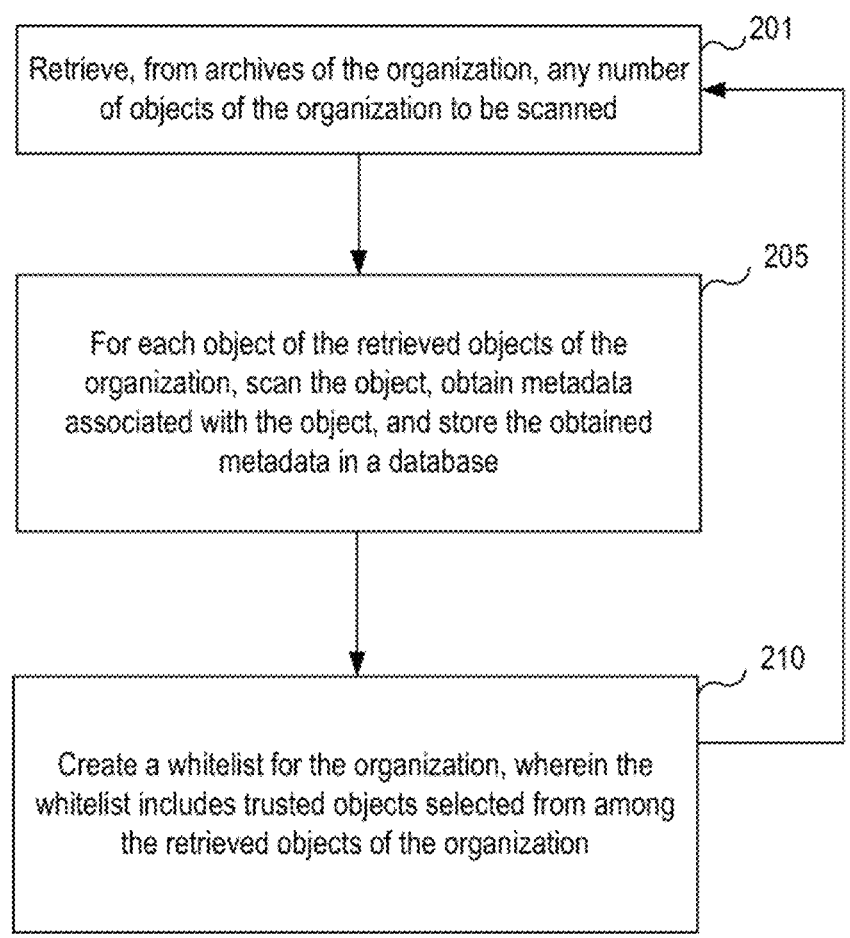
FIG. 2 illustrates a flow diagram of a method for building optimal whitelists for protecting devices from malwares.

FIG. 2 illustrates a flow diagram of method 200 for building optimal whitelists for protecting devices from malwares. The method 200 may be implemented on a server, e.g., an application server 116, or a computing device for providing a protection service to entities, e.g., organizations.

In step 201, the method 200 retrieves, from archives of the organization, any number of objects of the organization to be scanned.

In step 205, for each object of the retrieved objects of the organization, the method 200 scans the object, obtains metadata associated with the object, and stores the obtained metadata in a database.

In step 210, the method 200 creates a whitelist, e.g., whitelist 123, for the organization, wherein the whitelist includes trusted objects selected from among the retrieved objects of the organization.

In one aspect, the method 200 further comprises updating the whitelist created for the organization in a predetermined schedule.

In one aspect, the scanning of the object is performed using at least one of: static rules or a machine learning model.

In one aspect, the scanning of the object comprises: mounting the object as a temporary virtual drive, and scanning the object that is mounted as the temporary virtual drive.

In one aspect, the metadata associated with the object includes at least a parameter for storing a hash value of the object.

In one aspect, the metadata associated with the object further includes parameters for storing one or more of: a name of the object, a size of the object, a digital signature of the object, a number of machines where the object is used, a number of machines where the object is installed, a time at which the object first appears in the organization, flags for anti-malware scanning when the object was previously scanned by an anti-malware scanner.

In one aspect, the parameter for storing the hash value of the object is a primary key of the object for identifying the object in the database.

Figure 3:
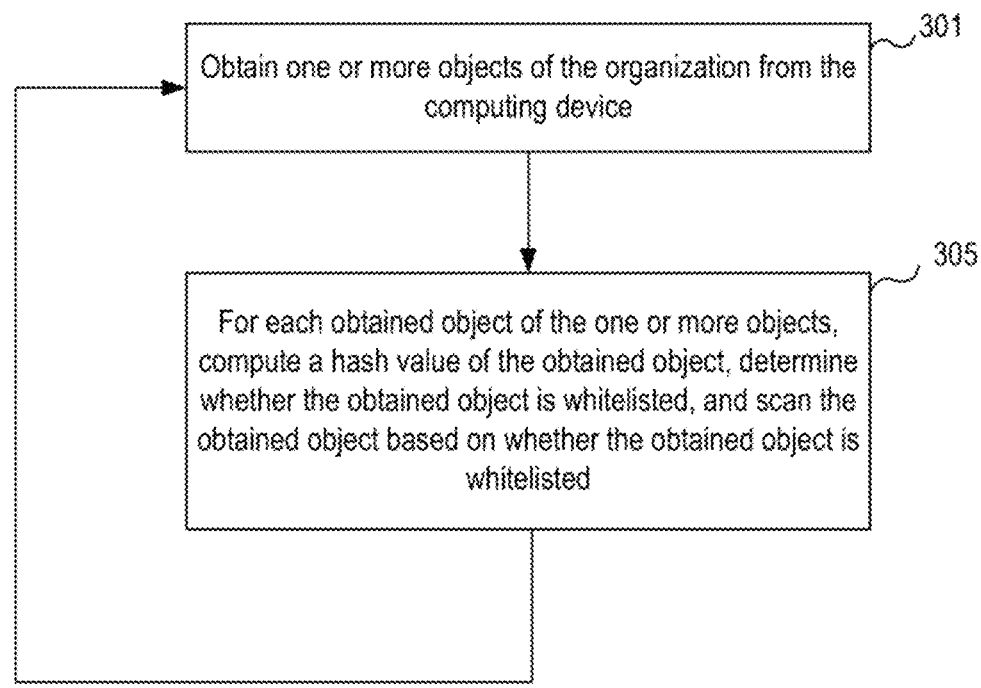
FIG. 3 illustrates a flow diagram of a method for scanning objects of a computing device, by an anti-malware, using a white list created for an organization based on data of the organization in accordance with aspects of the present disclosure.

FIG. 3 illustrates a flow diagram of method 300 for scanning objects of a computing device, by an anti-malware, using a white list created for an organization based on data of the organization in accordance with aspects of the present disclosure.

In step 301, method 300, obtains one or more objects of the organization from the computing device.

In step 305, for each obtained object of the one or more objects, method 300, computes a hash value of the obtained object, determines whether the obtained object is whitelisted, and scans the obtained object based on whether the obtained object is whitelisted, wherein the whitelist is created based on scanning of objects stored in archives of the organization, and the obtained object is determined as being whitelisted when the computed hash value of the obtained object matches a hash value of an object in a whitelist created for the organization.

In one aspect, the scanning of the obtained object based on whether the obtained object is whitelisted comprises:
for the obtained object that is not whitelisted, performing a scanning of the obtained object; and
for the obtained object that is determined as being whitelisted, skipping a scanning of the whitelisted obtained object.

In one aspect, the method further comprises providing a result of the scanning to a provider of a protection service.

In one aspect, the whitelist is created for the organization by:
retrieving, from the archives of the organization, any number of objects of the organization;
for each object of the retrieved objects of the organization, scanning the object, obtaining metadata associated with the object, and storing the obtained metadata in a database; and
creating the whitelist for the organization, wherein the whitelist includes trusted objects selected from among the retrieved objects of the organization.

In one aspect, the metadata associated with the object of the retrieved objects of the organization includes at least a parameter for storing a hash value of the object.

In one aspect, the metadata associated with the object of the retrieved objects of the organization further includes parameters for storing one or more of: a name of the object, a size of the object, a digital signature of the object, a number of machines where the object is used, a number of machines where the object is installed, a time at which the object first appears in the organization, flags for anti-malware scanning when the object was previously scanned by an anti-malware scanner. It is noted that the whitelist is built based on all the metadata associated with objects. However, an object is identified as being on the whitelist based on the hash value of the object. The other metadata of the object is not needed for identification of the object as being on the whitelist.

In one aspect, the scanning of the retrieved object is performed using at least one of: static rules or a machine learning model.

In one aspect, the whitelist created for the organization is updated in a predetermined schedule.

In one aspect, the scanning of the object further comprises: mounting the object as a temporary virtual drive; and scanning the object that is mounted as the temporary virtual drive.

In one aspect, the parameter for storing the hash value of the object is a primary key of the object for identifying the object in the database.

Figure 4:
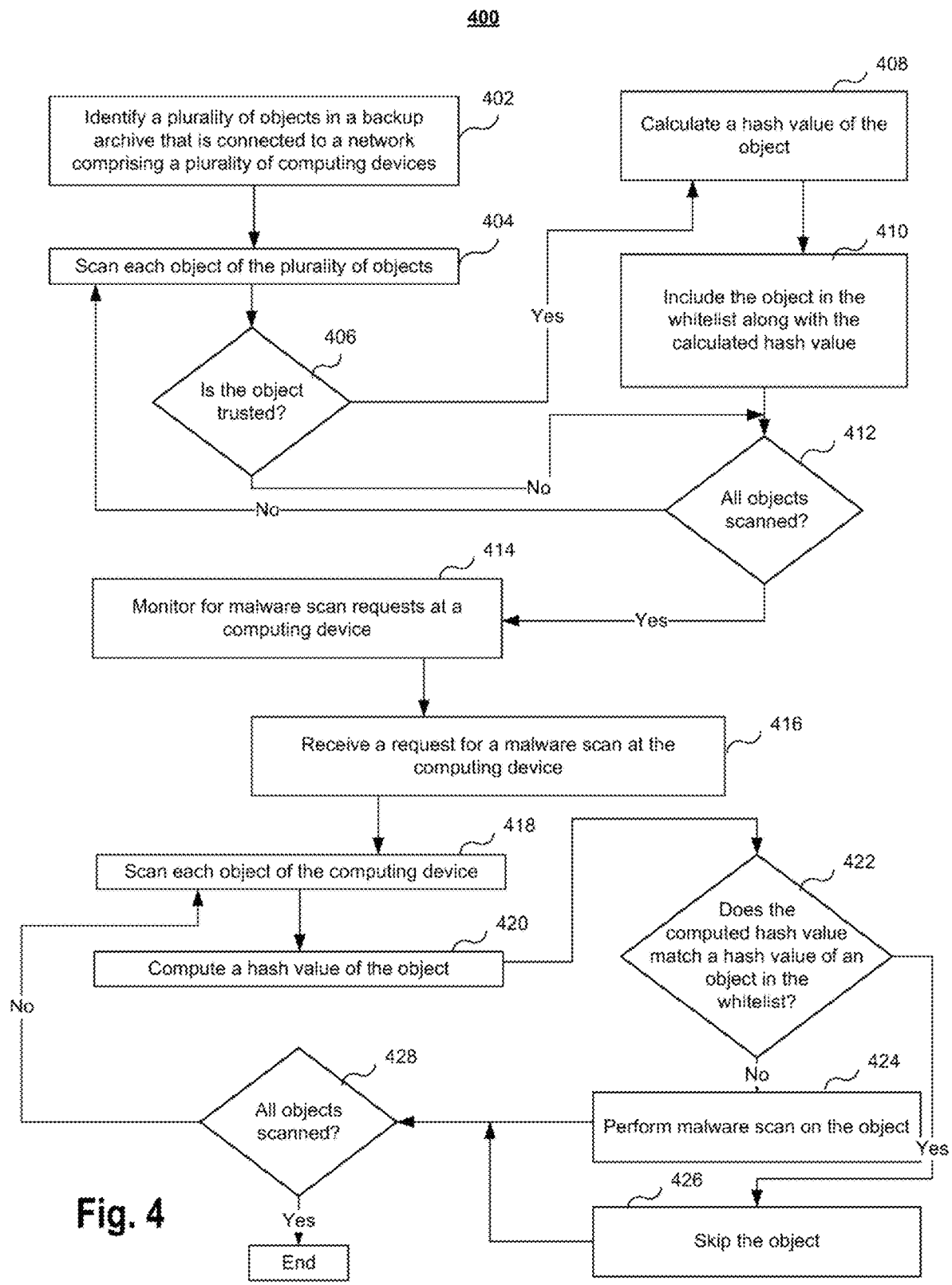
FIG. 4 illustrates a flow diagram of a method for building optimal whitelists for protecting devices from malwares and performing a malware scan, in accordance with aspects of the present disclosure.

FIG. 4 illustrates a flow diagram of method 400 for building optimal whitelists for protecting devices from malwares and performing a malware scan, in accordance with aspects of the present disclosure. In some aspects, anti-malware scanner 122 may be a thin client application on application server 116 and may have a counterpart thick client application on a computing device (e.g., workstation 125a). The thin client may provide the thick client with information such as the latest malware/virus definitions and the whitelist 123.

At 402, application server 116 identifies a plurality of objects in a backup archive (e.g., mounted archive 118 and/or mounted archive 119) that is connected to a network (e.g., network 102) comprising a plurality of computing devices (e.g., workstation 125a, server 124b, etc.). At 404, archive scanner 120 scans each object of the plurality of objects. For example, suppose that an object of the plurality of objects is the application Microsoft Word. At 406, archive scanner 120 determines whether the object is trusted. In response to determining that the object is not trusted, method 400 advances to 412, where archive scanner 120 determines whether all objects in the plurality of objects have been scanned. In response to determining that more objects still need to be scanned, method 400 returns to 404.

In response to determining that a particular object (e.g., Microsoft Word) is trusted, at 408, archive scanner 120 calculates a hash value of the object using a hash function such as (but not limited to) MD5, SHA-1, and SHA-256. At 410, archive scanner 120 includes the object in a whitelist along with the calculated hash value. For example, archive scanner 120 may include an identifier of Microsoft Word (e.g., a title) and the calculated hash value of the application in whitelist 123. At 412, suppose that all objects are scanned in the plurality of objects. At this time, whitelist 123 may comprise a subset of the plurality of objects (e.g., 50 of the 100 objects in the backup archive may be deemed as trusted and are thus included in the whitelist).

At 414, anti-malware scanner 122 monitors for malware scan requests at a computing device of network 102. At 416, anti-malware scanner 122 receives a request for a malware scan at the computing device (e.g., to scan local files). At 418, anti-malware scanner 122 scans each object of the computing device. Suppose that anti-malware scanner 122 identifies a local copy of the application Microsoft Word as the first object of 100 local objects on the computing device. At 420, anti-malware scanner 122 computes a hash value of the object. At 422, anti-malware scanner 122 determines whether the computed hash value matches a hash value of any object in the whitelist. More specifically, anti-malware scanner 122's thin client on application server 116 may provide an updated whitelist 123 to anti-malware scanner 122's thick client on the computing device. The whitelist comprises a plurality of hash values that anti-malware scanner 122 compares the computed hash value against.

In response to determining a match, at 426, anti-malware scanner 122 skips the object (does not perform the scan) to save time and resources. Referring to the overarching example, the copy of Microsoft Word in the backup archive is deemed trusted and is identical to the local copy of Microsoft Word. Accordingly, the object does not have to be scanned twice. As a whole organization, this saves a considerable amount of resources and time because none of the computing devices would need to scan the Microsoft Word application. At 428, anti-malware scanner 123 determines whether all objects have been scanned. In response to determining that more objects are to be scanned, method 400 returns to 418. In response to determining that all objects have been scanned, method 400 ends.

Figure 5:
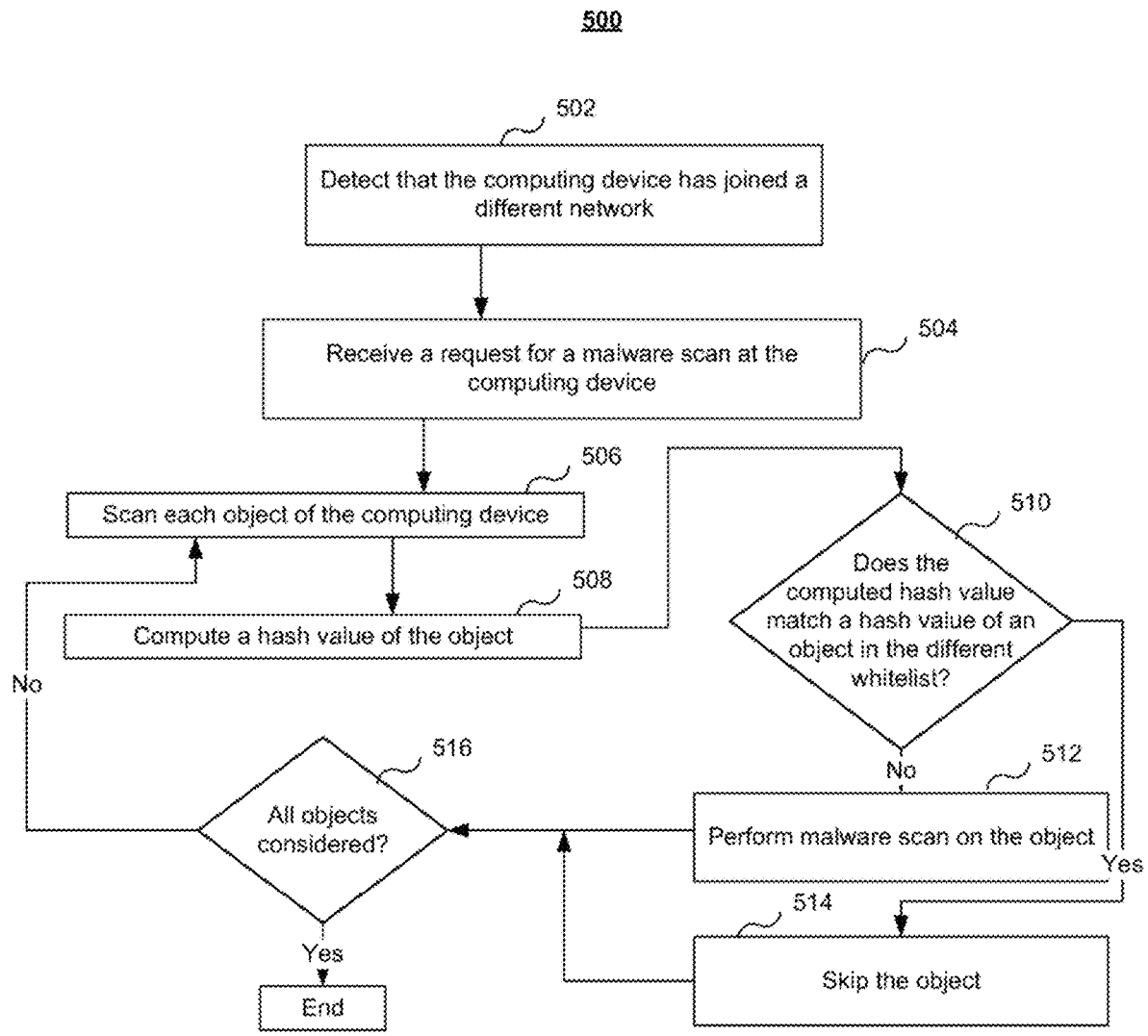
FIG. 5 illustrates a flow diagram of a method for performing a malware scan in a different network, in accordance with aspects of the present disclosure.

FIG. 5 illustrates a flow diagram of method 500 for performing a malware scan in a different network, in accordance with aspects of the present disclosure. At 502, anti-malware scanner 123 on a computing device detects that the computing device has joined a different network and has left network 102. At 504, anti-malware scanner 123 receives a request for a malware scan at the computing device.

At 506, anti-malware scanner 123 scans each object of the computing device. At 508, anti-malware scanner 123 computes a hash value of the object. Suppose that the object is once again the application Microsoft Word. The different network may have its own whitelist that does not include the application Microsoft Word. For example, Microsoft Word may not be in the archives of the different organization and thus, archive scanner 120 of the different organization may not include in the whitelist. At 510, anti-malware scanner 123 may request the whitelist of the different organization and determine whether the computed hash value matches any of the hash values of the objects in the different whitelist.

In response to determining a match, at 514, the object is skipped. However, in response to determining no match, at 512, anti-malware scanner 123 performs the malware scan on the object. It is thus possible that an object that was in the whitelist of the first network is not in the whitelist of the second network (and vice versa). At 516, anti-malware scanner 123 determines whether all objects have been scanned. In response to determining that more objects are to be scanned, method 500 returns to 506. In response to determining that all objects have been scanned, method 500 ends.

Figure 6:
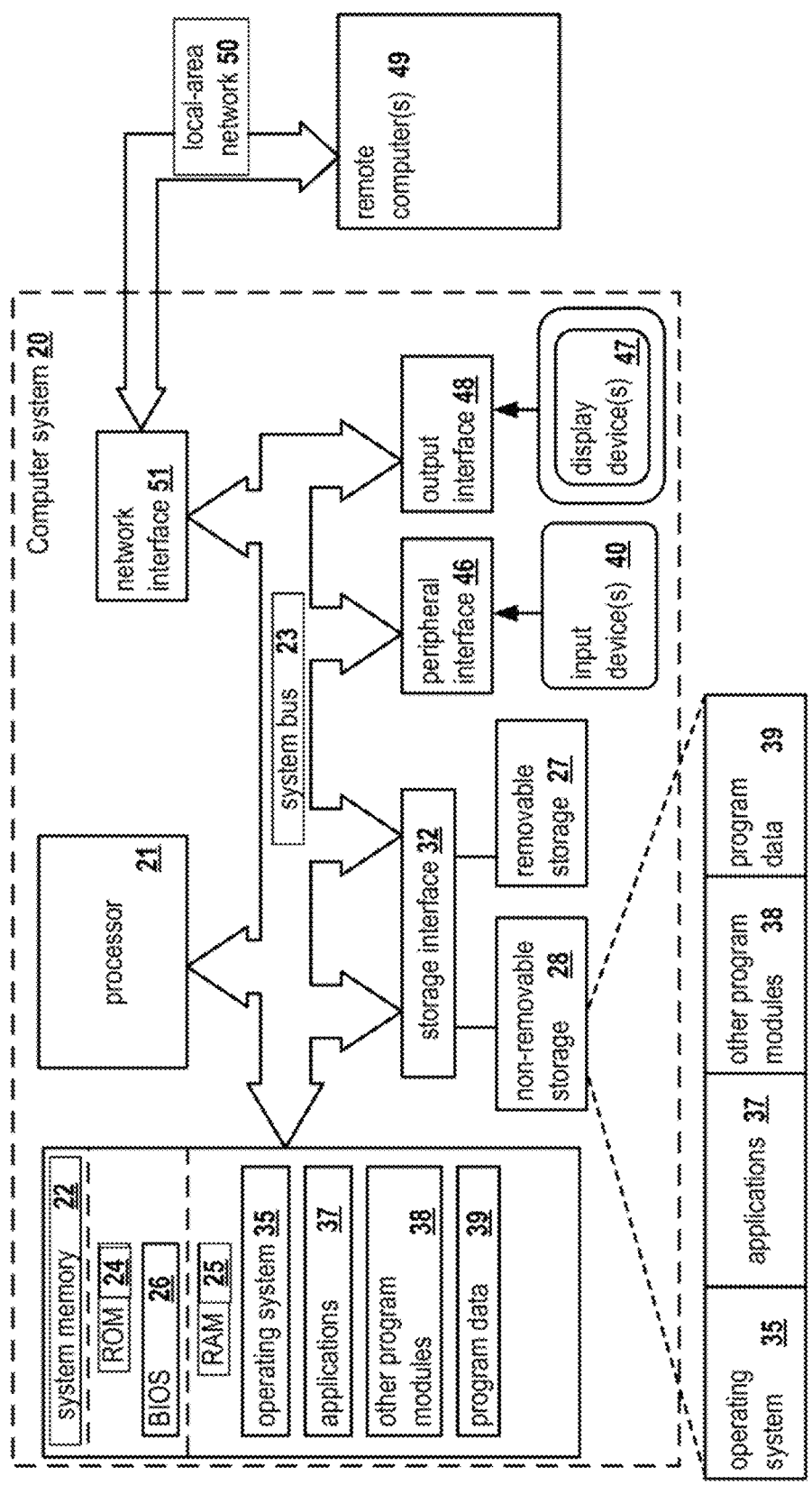
FIG. 6 presents an example of a general-purpose computer system on which aspects of the present disclosure can be implemented.

FIG. 6 is a block diagram illustrating a computer system 20 on which aspects of systems and methods for scanning objects of a computing device, by an anti-malware, using a white list created for an organization based on data of the organization may be implemented in accordance with an exemplary aspect. The computer system 20 may also be used for implementing aspects of the systems and methods for building optimal whitelists for protecting devices from malwares may be implemented in accordance with an exemplary aspect. It should be noted that the computer system 20 can correspond to elements of the protection service 103, for example, or to the device on which the anti-malware scanner 122 is implemented, as described earlier. As noted earlier, the anti-malware scanner may be part of the protection service or may be at the client location. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for anti-malware scanning, the method comprising:
    identifying a plurality of objects in a backup archive that is connected to a first network comprising a plurality of computing devices;
    scanning the plurality of objects in the backup archive to generate a whitelist, wherein the whitelist identifies (1) a subset of the plurality of objects that do not need to be scanned at a subsequent time and (2) respective hash values of objects in the subset;
    initiating, using the whitelist, a first malware scan in a computing device of the plurality of computing devices;
    wherein the first malware scan comprises for each object of the computing device,
        computing a hash value of the object,
        determining whether the object is in the whitelist by comparing the hash value of the object with the respective hash values of the objects identified in the whitelist, and
        in response to determining that the object is in the whitelist, not scanning the object in the first malware scan;
    detecting that the computing device has left the first network to join a second network of a different organization; and
    initiating a second malware scan on the computing device, wherein the second malware scan uses a different whitelist of the different organization.

2. The method of claim 1, further comprising in response to determining that the object is not in the whitelist, scanning the object in the malware scan.

3. The method of claim 1, further comprising providing a result of the malware scan to a provider of a protection service.

4. The method of claim 1, wherein scanning the plurality of objects in the backup archive to generate the whitelist further comprises:
    for each respective object of the plurality of objects, scanning the respective object, obtaining metadata associated with the respective object, and storing the obtained metadata in a database.

5. The method of claim 4, wherein the metadata associated with a respective object of the plurality of objects of the organization includes at least a parameter for storing a respective hash value of the respective object.

6. The method of claim 5, wherein the metadata associated with the respective object of the plurality of objects of the organization further includes parameters for storing one or more of: a name of the respective object, a size of the respective object, a digital signature of the respective object, a number of the plurality of computing devices where the respective object is used, a number of the plurality of computing devices where the respective object is installed, a time at which the respective object first appears in the organization, flags for anti-malware scanning when the respective object was previously scanned by an anti-malware scanner.

7. The method of claim 1, wherein a first object, which (1) was not scanned in the first malware scan and (2) is in the whitelist, is scanned in the second malware scan in response to determining that the first object is not in the different whitelist.

8. The method of claim 1, wherein a first object, which (1) was scanned in the first malware scan and (2) is not in the whitelist, is not scanned in the second malware scan in response to determining that the first object is in the different whitelist.

9. A system for anti-malware scanning, the system comprising:
    at least one hardware processor of a server configured to:
        identify a plurality of objects in a backup archive that is connected to a first network comprising a plurality of computing devices;
        scan the plurality of objects in the backup archive to generate a whitelist, wherein the whitelist identifies (1) a subset of the plurality of objects that do not need to be scanned at a subsequent time and (2) respective hash values of objects in the subset;
        initiate, using the whitelist, a first malware scan in a computing device of the plurality of computing devices;
        wherein the first malware scan comprises for each object of the computing device,
            computing a hash value of the object,
            determining whether the object is in the whitelist by comparing the hash value of the object with the respective hash values of the objects identified in the whitelist, and
            in response to determining that the object is in the whitelist, not scan the object in the first malware scan;
        detect that the computing device has left the first network to join a second network of a different organization; and
        initiate a second malware scan on the computing device, wherein the second malware scan uses a different whitelist of the different organization.

10. The system of claim 9, wherein the at least one hardware processor is further configured to in response to determining that the object is not in the whitelist, scan the object in the malware scan.

11. The system of claim 9, wherein the at least one hardware processor is further configured to provide a result of the malware scan to a provider of a protection service.

12. The system of claim 9, wherein the at least one hardware processor is further configured to scan the plurality of objects in the backup archive to generate the whitelist by for each respective object of the plurality of objects, scanning the respective object, obtaining metadata associated with the respective object, and storing the obtained metadata in a database.

13. The system of claim 12, wherein the metadata associated with a respective object of the plurality of objects of the organization includes at least a parameter for storing a respective hash value of the respective object.

14. The system of claim 13, wherein the metadata associated with the respective object of the plurality of objects of the organization further includes parameters for storing one or more of: a name of the respective object, a size of the respective object, a digital signature of the respective object, a number of the plurality of computing devices where the respective object is used, a number of the plurality of computing devices where the respective object is installed, a time at which the respective object first appears in the organization, flags for anti-malware scanning when the respective object was previously scanned by an anti-malware scanner.

15. The system of claim 9, wherein a first object, which (1) was not scanned in the first malware scan and (2) is in the whitelist, is scanned in the second malware scan in response to determining that the first object is not in the different whitelist.

16. The system of claim 9, wherein a first object, which (1) was scanned in the first malware scan and (2) is not in the whitelist, is not scanned in the second malware scan in response to determining that the first object is in the different whitelist.

17. A non-transitory computer readable medium storing thereon computer executable instructions for anti-malware scanning, comprising instructions for:
   identifying a plurality of objects in a backup archive that is connected to a first network comprising a plurality of computing devices;
   scanning the plurality of objects in the backup archive to generate a whitelist, wherein the whitelist identifies (1) a subset of the plurality of objects that do not need to be scanned at a subsequent time and (2) respective hash values of objects in the subset;
   initiating, using the whitelist, a first malware scan in a computing device of the plurality of computing devices;
   wherein the first malware scan comprises for each object of the computing device,
      computing a hash value of the object,
      determining whether the object is in the whitelist by comparing the hash value of the object with the respective hash values of the objects identified in the whitelist, and
      in response to determining that the object is in the whitelist, not scanning the object in the first malware scan;
   detecting that the computing device has left the first network to join a second network of a different organization; and
   initiating a second malware scan on the computing device, wherein the second malware scan uses a different whitelist of the different organization.

18. The non-transitory computer readable medium of claim 17, further comprising instructions for in response to determining that the object is not in the whitelist, scanning the object in the malware scan.

\* \* \* \* \*